(12) United States Patent
Movshovich et al.

(10) Patent No.: US 11,048,082 B1
(45) Date of Patent: Jun. 29, 2021

(54) WIRELESS BANDWIDTH REDUCTION WITH DISPLAY DATA INTERLEAVING

(71) Applicant: Apple Inc., Cupertino, CA (US)

(72) Inventors: Aleksandr M. Movshovich, Santa Clara, CA (US); Yanli Zhang, Los Altos, CA (US); Paul V. Johnson, San Francisco, CA (US); Holly E. Gerhard, Cupertino, CA (US); Arthur Y. Zhang, San Jose, CA (US); Moinul H. Khan, San Diego, CA (US)

(73) Assignee: Apple Inc., Cupertino, CA (US)

( * ) Notice: Subject to any disclaimer, the term of this patent is extended or adjusted under 35 U.S.C. 154(b) by 95 days.

(21) Appl. No.: 16/377,500

(22) Filed: Apr. 8, 2019

Related U.S. Application Data

(60) Provisional application No. 62/657,464, filed on Apr. 13, 2018.

(51) Int. Cl.
*G02B 27/01* (2006.01)
*H04N 13/385* (2018.01)
(Continued)

(52) U.S. Cl.
CPC ..... *G02B 27/0103* (2013.01); *G02B 27/0093* (2013.01); *G02B 27/017* (2013.01);
(Continued)

(58) Field of Classification Search
CPC ............ G02B 27/0103; G02B 27/0093; G02B 27/017; H04N 13/385; H04L 1/006; G06F 3/013
(Continued)

(56) References Cited

U.S. PATENT DOCUMENTS

| 7,345,665 | B2 | 3/2008 | Chang |
| 8,874,284 | B2 | 10/2014 | Sanders-Reed |

(Continued)

OTHER PUBLICATIONS

Johnson, Paul; Kim, Joohwan and Banks, Martin S., "Stereoscopic 3D Display Technique Using Spatiotemporal Interlacing has Improved Spatial and Temporal Properties", 2015 OSA, Apr. 6, 2015, vol. 23, No. 7, Optics Express 9252, pp. 1-24.

(Continued)

*Primary Examiner* — Jimmy H Nguyen
(74) *Attorney, Agent, or Firm* — Thompson Hine LLP

(57) ABSTRACT

One exemplary implementation involves performing operations at an electronic device with one or more processors and a computer-readable storage medium. The device establishes a wireless communication link with a host device. The device receives, from the host device, a left eye frame and a right eye frame via a sequence of interleaved left eye frame transmissions and right eye frame transmissions. The device loads the left eye frame into a left eye display device and loads the right eye frame into a right eye display device on the electronic device, where the loading includes sequentially loading left eye frame portions and right eye frame portions as the sequence of interleaved left eye frame transmissions and right eye frame transmissions is received. The device then concurrently displays the left eye frame and the right eye frame at the electronic device. The device switches data transmissions schemes according to wireless communication link quality and eye gaze tracking.

20 Claims, 14 Drawing Sheets

(51) Int. Cl.
   *H04L 1/00* (2006.01)
   *G06F 3/01* (2006.01)
   *G02B 27/00* (2006.01)

(52) U.S. Cl.
   CPC ............ *G06F 3/013* (2013.01); *H04L 1/0006* (2013.01); *H04N 13/385* (2018.05); *G02B 2027/014* (2013.01)

(58) Field of Classification Search
   USPC .......................................................... 345/8
   See application file for complete search history.

(56) References Cited

U.S. PATENT DOCUMENTS

| | | | |
|---|---|---|---|
| 9,083,958 B2 | 7/2015 | Martinez Bauza et al. | |
| 9,626,800 B2 | 4/2017 | Hall | |
| 9,791,700 B2 | 10/2017 | Schowengerdt | |
| 2012/0120050 A1 | 5/2012 | Hemminki | |
| 2012/0154386 A1* | 6/2012 | Nagara | G06F 3/147 345/419 |
| 2015/0317518 A1* | 11/2015 | Fujimaki | G02B 27/017 345/633 |

OTHER PUBLICATIONS

Hoffman, David M.; Karasev, Vasiliy I.; and Banks, Martin S., "Temporal Presentation Protocols in Stereoscopic Displays: Flicker Visibility, Perceived Motion and Perceived Depth", J. Soc Inf Disp.; Mar. 1, 2011 19(3), pp. 1-59.

Johnson, Paul V.; Kim, Joohwan; Hoffman, David M.; Vargas, Andy D.; and Banks, Martin S.; "Motion Artifacts on 240-Hz OLED Steroscopic 3D Displays", Journal of the SID, 2015; pp. 1-11.

* cited by examiner

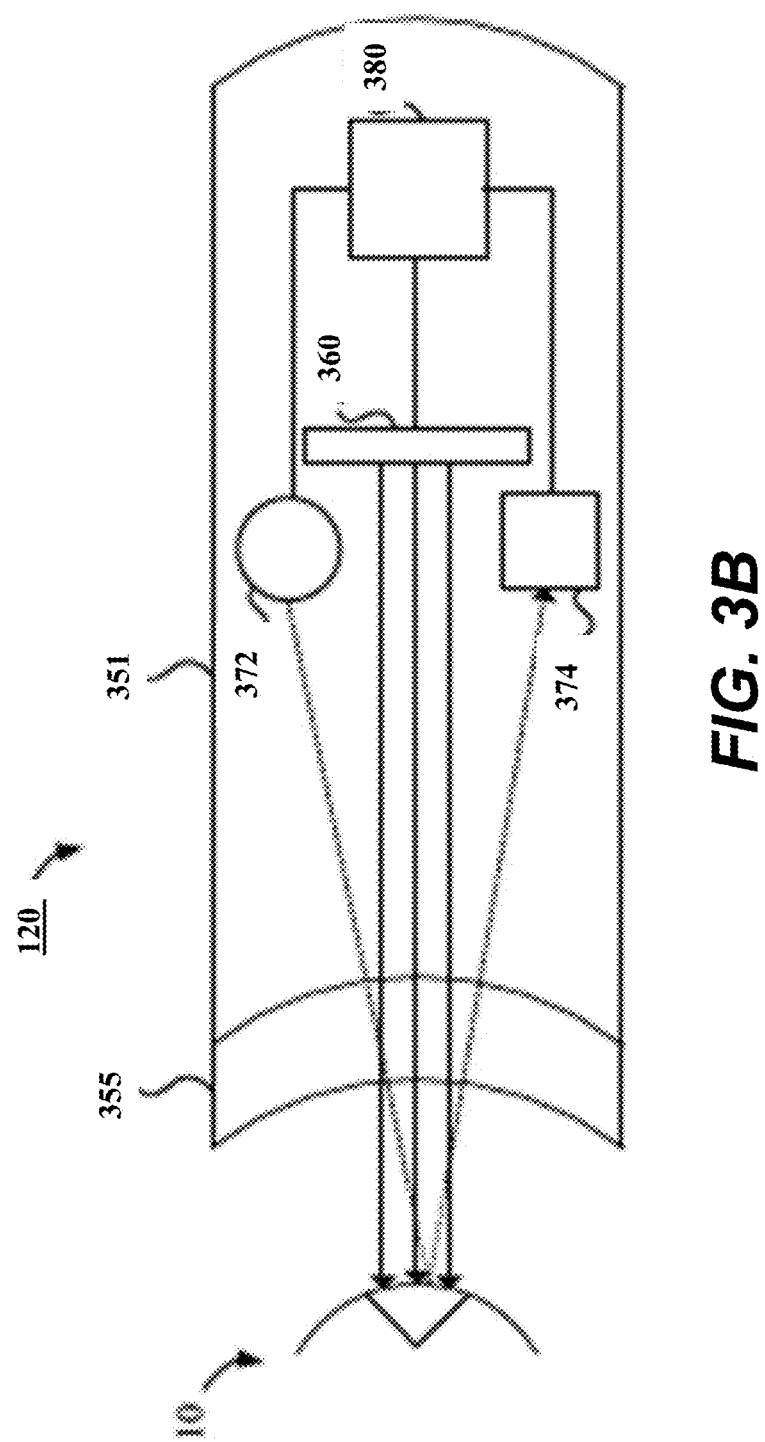

US 11,048,082 B1

WIRELESS BANDWIDTH REDUCTION WITH DISPLAY DATA INTERLEAVING

CROSS-REFERENCE TO RELATED APPLICATION

This Application claims the benefit of U.S. Provisional Application Ser. No. 62/657,464 filed Apr. 13, 2018, which is incorporated herein in its entirety.

TECHNICAL FIELD

The present disclosure generally relates to wireless communications between a head mounted display (HMD) and a base controller, and in particular, to systems, methods, and devices for wireless communication link data transmission schemes.

BACKGROUND

Wireless communications between an HMD and a base controller are error prone. Existing wireless communications methods and/or systems need improved transmission schemes that can reduce error, improve quality, reduce bandwidth, and reduce power consumption by the device.

SUMMARY

Various implementations disclosed herein include devices, systems, and methods that use wireless communications between an HMD and a base controller. One exemplary implementation involves performing operations at an electronic device with one or more processors and a computer-readable storage medium. The device establishes a wireless communication link with a host device. The device receives, from the host device, a left eye frame and a right eye frame via a sequence of interleaved left eye frame transmissions and right eye frame transmissions. The device loads the left eye frame into a left eye display device and loads the right eye frame into a right eye display device on the electronic device, where the loading includes sequentially loading left eye frame portions and right eye frame portions as the sequence of interleaved left eye frame transmissions and right eye frame transmissions is received. The device then concurrently displays the left eye frame and the right eye frame at the electronic device.

Various implementations configure a wireless communication link to efficiently receive stereoscopic images for concurrent video content display. The transmission characteristics of the wireless communication link are monitored. Efficiency is achieved, for example, by interleaving left eye frame transmissions and right eye frame transmissions. Additional data transmission schemes trade data latency with data redundancy to reduce overall data transmission errors. Further, data transmission schemes can include staggering or alternating the display of the left eye frame and the right eye frame at the electronic device.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 3B is a block diagram of an example HMD in accordance with some implementations.

Figure 1:
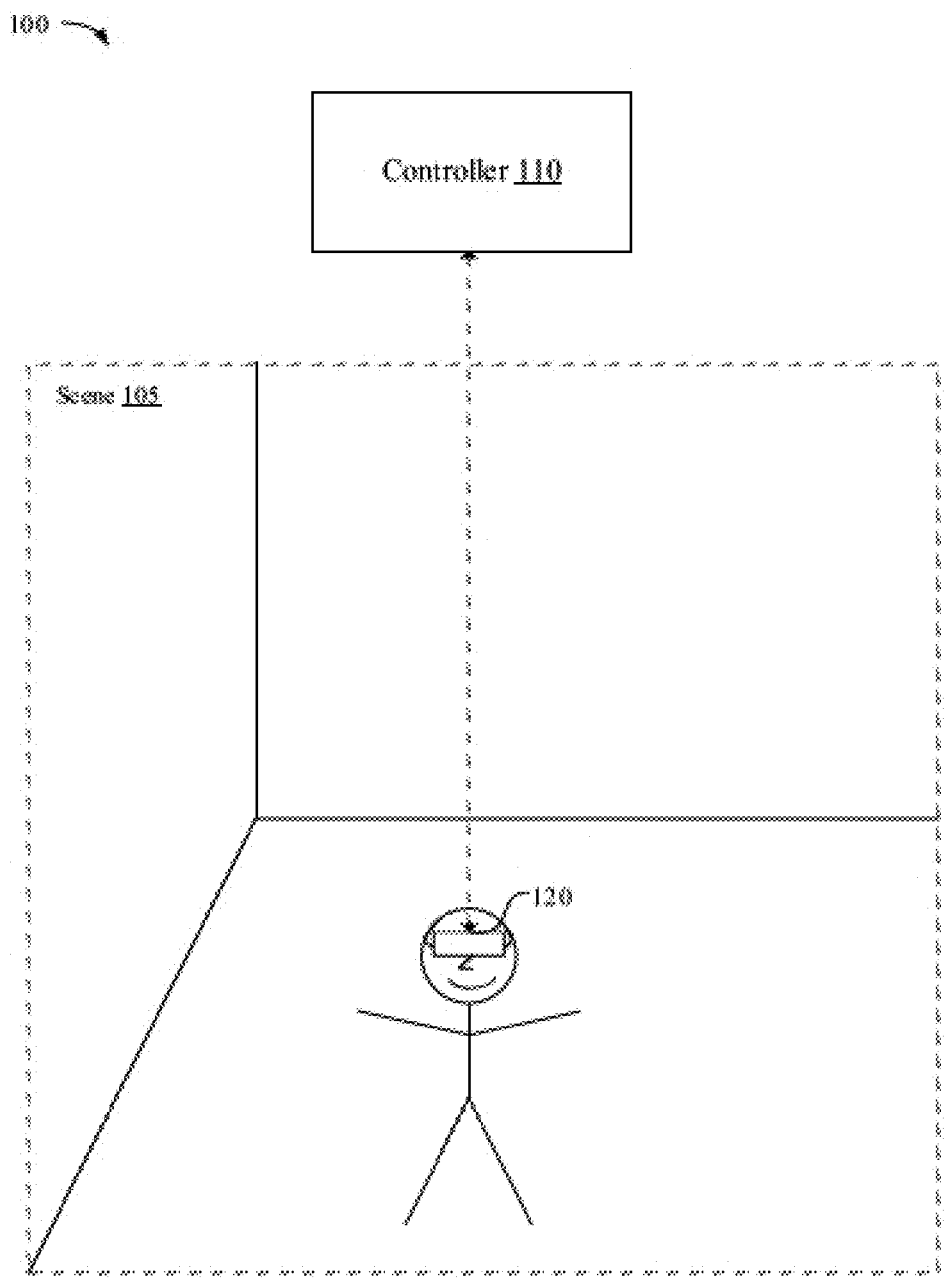
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein. While FIGS. 1-3B depict exemplary implementations involving a head mounted device (HMD), other implementations do not necessarily involve a HMD and may involve other types of devices including, but not limited to, watches and other wearable electronic devices, mobile devices, laptops, desktops, gaming devices, home automation devices, and other devices that include or use image capture devices.

In various method, system and/or electronic device implementations, transmitting to/receiving at a portable electronic device (e.g., an HMD) interleaved left eye and right eye portions can reduce or minimize the loading/buffering needed at the electronic device and/or reduce the time offset required between transmission to and display at the electronic device. Such interleaved left eye and right eye portions include a wirelessly transmissible packet, a line of an image frame, a slice of the image frame or a portion of the image frame, respectively, for a left eye display device and a right eye display device. In some implementations, eye tracking at the HMD allows the use of foveated images for the left and a right eye display devices to reduce an amount of data transmitted to/received at the HMD for balancing available bandwidth and reducing power consumption while still presenting/displaying quality video content.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and a HMD 120, one or both of which may be in a physical environment. A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In some implementations, the controller 110 is configured to manage and coordinate a computer-generated reality (CGR) experience for the user. In some implementations, the controller 110 includes a suitable combination of software, firmware, or hardware. The controller 110 is described in greater detail below with respect to FIG. 2. In some implementations, the controller 110 is a computing device that is local or remote relative to a physical environment 105.

In one example, the controller 110 is a local server located within the physical environment 105. In another example, the controller 110 is a remote server located outside of the physical environment 105 (e.g., a cloud server, central server, etc.). In some implementations, the controller 110 is communicatively coupled with the HMD 120 via one or more wired or wireless communication channels 144 (e.g., BLUETOOTH, IEEE 802.11x, IEEE 802.16x, IEEE 802.3x, etc.). In various implementations, a serial wireless communication link between the controller 110 and the HMD 120 will have a line-of-sight (LOS) communications data transmission rate such as Y Gigabytes per second (Gbps) that is greater than a non-LOS data transmission rate Y' Gbps.

In some implementations, the controller 110 and the HMD 120 are configured to present the CGR experience to the user together.

In some implementations, the HMD 120 is configured to present the CGR experience to the user. In some implementations, the HMD 120 includes a suitable combination of software, firmware, or hardware. The HMD 120 is described in greater detail below with respect to FIGS. 3A-3B. In some implementations, the functionalities of the controller 110 are provided by or combined with the HMD 120, for example, in the case of a HMD that functions as a stand-alone unit.

According to some implementations, the HMD 120 presents a CGR experience to the user while the user is present within the physical environment 105. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 2:
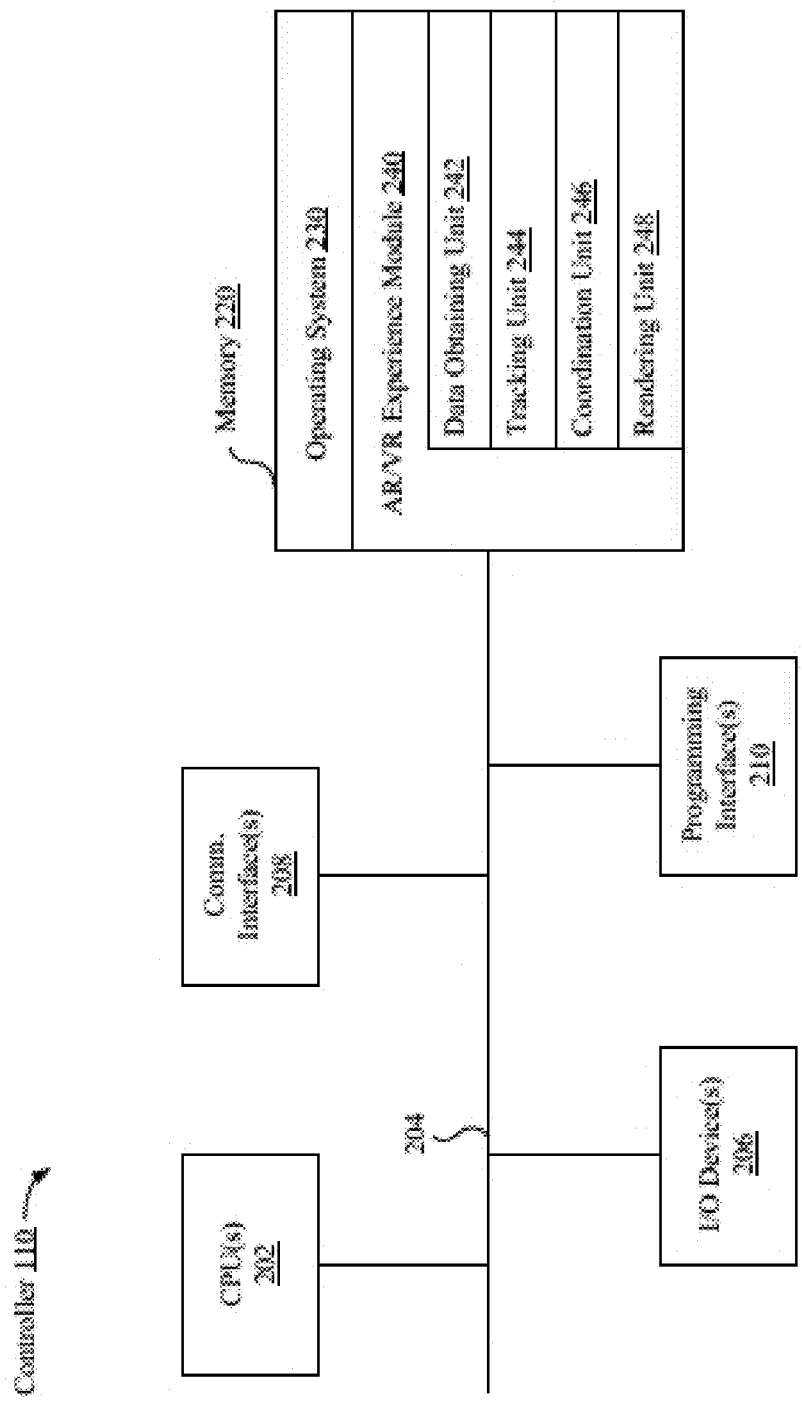
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image capture devices or other sensors, one or more displays, or the like.

The memory 220 includes high-speed random-access memory, such as dynamic random-access memory (DRAM), static random-access memory (CGRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and computer-generated reality (CGR) experience module 240.

The operating system 230 includes procedures for handling various basic system services and for performing hardware dependent tasks.

In some implementations, the CGR experience module 240 is configured to manage and coordinate one or more CGR experiences for one or more users (e.g., a single CGR experience for one or more users, or multiple CGR experiences for respective groups of one or more users). In various implementations, the controller 110 renders a stereoscopic view of a CGR experience for presentation at the HMD 120. In some implementations, the controller 110 renders a left eye image and a right eye image of the stereoscopic view of the CGR experience for simultaneous respective presentation on a left eye display device and a right eye display device at the HMD 120. In some implementations, the stereoscopic view covers less than 150° of the physical environment, less than 90° of the physical environment, and/or less than 30° of the physical environment. In one implementation, the controller 110 renders pairs of left and right eye images for transmission to and presentation at the HMD 120 at a constant rate such as 120 frames per second (fps). To that end, in various implementations, the CGR experience module 240 includes a data obtaining unit 242, a tracking unit 244, a coordination unit 246, and a rendering unit 248.

In some implementations, the data obtaining unit 242 is configured to obtain data (e.g., presentation data, interaction data, sensor data, location data, etc.) from at least the HMD 120. To that end, in various implementations, the data obtaining unit 242 includes instructions and/or logic therefor, and heuristics and metadata therefor.

In some implementations, the tracking unit 244 is configured to map the physical environment 105 and to track the position/location of at least the HMD 120 with respect to the physical environment 105. To that end, in various implementations, the tracking unit 244 includes instructions and/or logic therefor, and heuristics and metadata therefor.

In some implementations, the coordination unit 246 is configured to manage and coordinate the CGR experience presented to the user by the HMD 120. To that end, in various implementations, the coordination unit 246 includes instructions and/or logic therefor, and heuristics and metadata therefor.

In some implementations, the rendering unit 248 is configured to render content for display on the HMD 120. To that end, in various implementations, the rendering unit 248 includes instructions and/or logic therefor, and heuristics and metadata therefor. In various implementations, rendering unit 248 includes a first image generating processor to determine image frames of the stereoscopic view for presentation to the left eye, another different second image generating processor to determine image frames of the stereoscopic view for concurrent presentation to the right eye, and a multiplexing processor to combine (e.g., interleave) data of the image frames from the first image generating processor with data of the image frames from the second image generating processor for transmission over a serial wireless communication link between the controller 110 and the HMD 120.

In various implementations, the rendering unit 248 interleaves data of the image frames from the first image generating processor with data of the image frames from the second image generating processor for transmission to improve presented image or video quality at the HMD 120. In some implementations, image or video quality can be improved by reducing latency, improving data redundancy, reducing motion to photon latency or reducing communication link transmission errors. The rendering unit 248 interleaves data of the image frames from the first image generating processor with data of the image frames from the second image generating processor at a size smaller than the image frame size. For example, the rendering unit 248 is interleaving data such as a plurality of rows of an image frame, a single row of an image frame, or a packet (e.g., a smallest transmissible unit) of the wireless communication link.

Although the data obtaining unit 242, the tracking unit 244, the coordination unit 246, and the rendering unit 248 are shown as residing on a single device (e.g., the controller 110), it should be understood that in other implementations, any combination of the data obtaining unit 242, the tracking unit 244, the coordination unit 246, and the rendering unit 248 may be located in separate computing devices.

Although these system components are shown as residing on a single device (e.g., the controller 110), it should be understood that in other implementations, any combination of these system components may be located in separate computing devices. Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 3A:
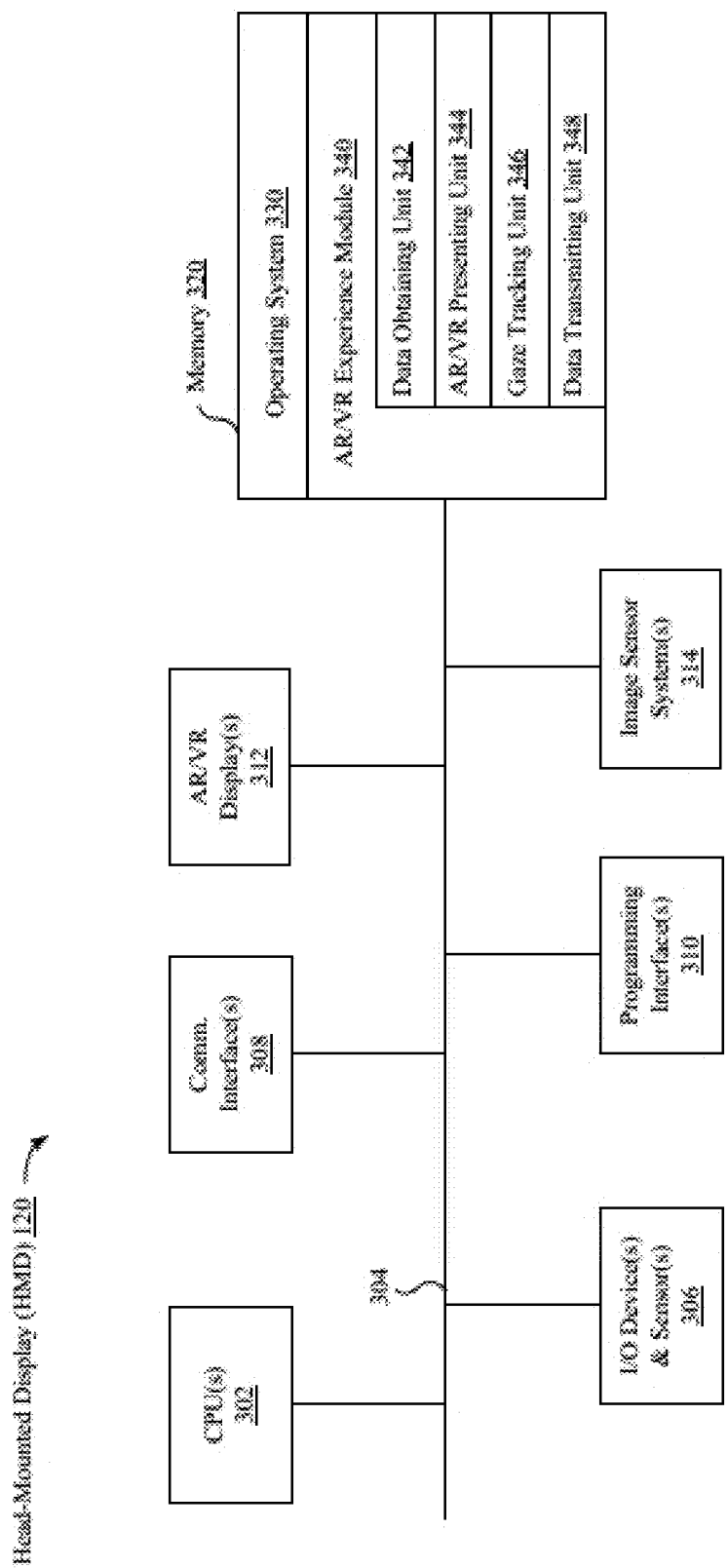
FIG. 3A is a block diagram of an example HMD in accordance with some implementations.

FIG. 3A is a block diagram of an example of the HMD 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 120 includes one or more processing units 302 (e.g., microprocessors, ASICs, FPGAs, GPUs, CPUs, processing cores, or the like), one or more input/output (I/O) devices and sensors 306, one or more communication interfaces 308 (e.g., USB, FIRE-WIRE, THUNDERBOLT, IEEE 802.3x, IEEE 802.11x, IEEE 802.16x, GSM, CDMA, TDMA, GPS, IR, BLU-ETOOTH, ZIGBEE, SPI, I2C, or the like type interface), one or more programming (e.g., I/O) interfaces 310, one or more displays 312, one or more interior or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 312 are configured to present an CGR experience to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 312 correspond to diffractive, reflective, polarized, holographic, etc. waveguide displays. For example, the HMD 120 includes a single display. In another example, the HMD 120 includes a display for each eye of the user.

In some implementations, the one or more image sensor systems 314 are configured to obtain image data that corresponds to at least a portion of the face of the user that includes the eyes of the user. For example, the one or more image sensor systems 314 include one or more RGB camera (e.g., with a complimentary metal-oxide-semiconductor (CMOS) image sensor or a charge-coupled device (CCD) image sensor), monochrome camera, IR camera, event-based camera, and/or the like. In various implementations, the one or more image sensor systems 314 further include illumination sources that emit light upon the portion of the face of the user, such as a flash or a glint source.

The memory 320 includes high-speed random-access memory, such as DRAM, CGRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a CGR experience module 340.

The operating system 330 includes procedures for handling various basic system services and for performing hardware dependent tasks.

In some implementations, the CGR experience module 340 is configured to present CGR content to the user via the one or more displays 312. At the HMD 120, the data for paired images frames (e.g., corresponding left eye and right eye images) are separated, loaded respectively into a left eye display device and a right eye display device, and concurrently displayed at a frame rate such as 100 fps, 110 fps, or 120 fps. In one implementation, the CGR experience module 340 provides the controller 110 with position and orientation of the head of the user and/or position, orientation, and characteristics of the gaze of the user. To that end, in various implementations, the CGR experience module 340 includes a data obtaining unit 342, an CGR presenting unit 344, a gaze tracking unit 346, and a data transmitting unit 348.

In some implementations, the data obtaining unit 342 is configured to obtain data (e.g., presentation data, interaction data, sensor data, location data, etc.) from at least the controller 110. To that end, in various implementations, the data obtaining unit 342 includes instructions and/or logic therefor, and heuristics and metadata therefor.

In some implementations, the CGR presenting unit 344 is configured to present CGR content via the one or more displays 312. To that end, in various implementations, the CGR presenting unit 344 includes instructions and/or logic therefor, and heuristics and metadata therefor.

In some implementations, the gaze tracking unit 346 is configured to determine a gaze tracking characteristic of a user based on event messages received from an event camera. To that end, in various implementations, the gaze tracking unit 346 includes instructions and/or logic therefor, configured neural networks, and heuristics and metadata therefor.

In some implementations, the data transmitting unit 348 is configured to transmit data (e.g., presentation data, location data, etc.) to at least the controller 110. To that end, in various implementations, the data transmitting unit 348 includes instructions and/or logic therefor, and heuristics and metadata therefor.

Although the data obtaining unit 342, the CGR presenting unit 344, the gaze tracking unit 346, and the data transmitting unit 348 are shown as residing on a single device (e.g., the HMD 120), it should be understood that in other implementations, any combination of the data obtaining unit 342, the CGR presenting unit 344, the gaze tracking unit 346, and the data transmitting unit 348 may be located in separate computing devices.

Although these system components are shown as residing on a single device (e.g., the HMD 120), it should be understood that in other implementations, any combination of these system components may be located in separate computing devices. Moreover, FIG. 3A is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3A could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

FIG. 3B illustrates a block diagram of an example of the HMD 120 in accordance with some implementations. The HMD 120 includes a housing 351 (or enclosure) that houses various components of the HMD 120. The housing 351 includes (or is coupled to) one or more eye pads 355 disposed at a proximal (to the user 10) end of the housing 351. In various implementations, the eye pad 355 is a plastic or rubber piece that comfortably and snugly keeps the HMD 120 in the proper position on the face of the user 10 (e.g., surrounding one or more eyes of the user 10).

The housing 351 houses one or more displays 360 that displays an image (e.g., one display 360 for each eye), emitting light towards onto the eye of a user 10. In various implementations, the display 360 emits the light through an eyepiece (not shown) that refracts, reflects, or diffracts the light emitted by the display 360, making the display appear to the user 10 to be at a virtual distance (e.g., a focus distance to accommodate the eye focusing an image) farther than the actual distance from the eye to the display 360. In some implementations, the virtual distance is the binocularly rendered distance determined by binocular disparity (e.g., the angular offset between the two eyes). In various implementations, the virtual distance is adapted dynamically to the content the user is viewing. The dynamically adapted virtual distance reduces or minimizes the difference in eye vergence and focus distance in order to provide a better user experience. For the user to be able to focus on the display 360, in some implementations, the virtual distance is at least greater than a minimum focal distance of the eye (e.g., 7 cm). In some implementations, the virtual distance is greater than 1 meter.

Although FIG. 3B illustrates the HMD 120 including a display 360 and an eye pad 355, in various implementations, the HMD 120 does not include a display 360 or includes an optical see-through display without including an eye pad 355.

The housing 351 also houses a gaze tracking system including one or more light sources 372, camera 374, and a controller 380. The one or more light sources 372 emit light onto the eye of the user 10 that reflects as a light pattern (e.g., a circle of glints) that can be detected by the camera 374. Based on the light pattern, the controller 380 can determine a gaze tracking characteristic of the user 10. For example, the controller 380 can determine a gaze direction and/or a blinking state (eyes open or eyes closed) of the user 10. As another example, the controller 380 can determine a pupil center, a pupil size, or a point of regard. Thus, in various implementations, the light is emitted by the one or more light sources 372, reflects off the eye of the user 10, and is detected by the camera 374. In various implementations, the light from the eye of the user 10 is reflected off a hot mirror or passed through an eyepiece before reaching the camera 374.

The display 360 emits light in a first wavelength range and the one or more light sources 372 emit light in a second wavelength range. Similarly, the camera 374 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, gaze tracking (or, in particular, a determined gaze direction) is used to enable user interaction (e.g., the user 10 selects an option on the display 360 by looking at it), provide foveated rendering (e.g., present a higher resolution in an area of the display 360 the user 10 is looking at and a lower resolution elsewhere on the display 360), or reduce geometric distortion (e.g., in 3D rendering of objects on the display 360).

In various implementations, the one or more light sources 372 emit light towards the eye of the user which reflects in the form of a plurality of glints. In various implementations, the one or more light sources 372 emit light with modulating intensity towards the eye of the user. In various implementations, the one or more light sources 372 are differentially modulated in various ways. In various implementations, the one or more light sources 372 modulate the intensity of emitted light according to a gaze direction. In various implementations, the one or more light sources 372 modulate the intensity of emitted light according to user biometrics or presented user interface.

In various implementations, the camera 374 is a frame/shutter-based camera that, at a particular point in time or multiple points in time at a frame rate, generates an image of the eye of the user 10. Each image includes a matrix of pixel values corresponding to pixels of the image which correspond to locations of a matrix of light sensors of the camera.

Figure 4:
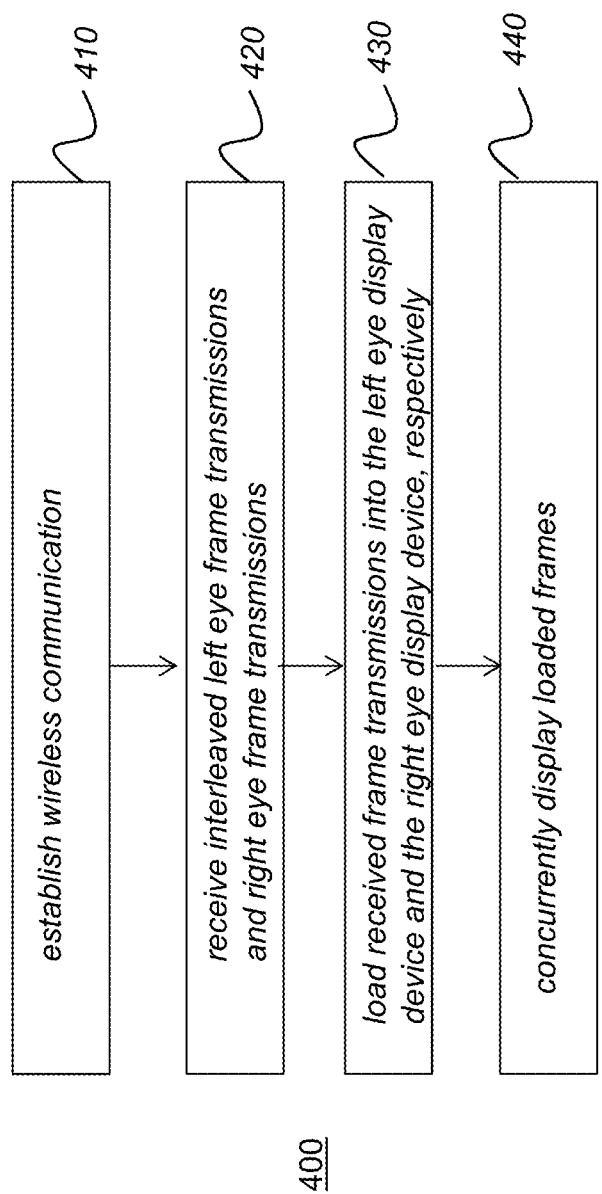
FIG. 4 is a flowchart representation of a method of operating a portable electronic device in accordance with some implementations.

FIG. 4 is a flowchart representation of a method of operating an electronic device (e.g., an HMD 120) in accordance with some implementations. In various implementations, example method 400 is performed by processing logic, including hardware, firmware, software, or a combination thereof. In some implementations, example method 400 is performed by a processor executing code stored in a non-transitory computer-readable medium (e.g., a memory). In some implementations, example method 400 is performed on a portable electronic device (e.g., laptop, tablet, smartphone, HMD) that has a screen for displaying 2D/3D images and/or a screen for viewing stereoscopic images and including operations such as a CGR display.

At block 410, the method 400 establishes a wireless communication link with a host device. In one implementation, the host device is a base station in communication with a HMD for a CGR experience.

At block 420, the method 400 receives, from the host device, a left eye frame and a right eye frame via a sequence of interleaved left eye frame transmissions and right eye frame transmissions. In some implementations, intermixed portions of a frame for the left eye and a frame for the right eye are received at the HMD device from the base station device. For example, frame transmissions include a first transmission for a first 5 lines of a left eye frame, a second transmission for a first five lines of a right eye frame, a third transmission for lines 6-10 of the left eye frame, a fourth transmission for lines 6-10 of the right eye frame, etc. Interleaving reduces an amount of bandwidth for the wireless signal or an amount of memory needed to buffer frame transmission data at the HMD device.

At block 430, the method 400 loads the received frame transmissions for a left eye frame into a left eye display device and frame transmissions for a right eye frame into a right eye display device (e.g., on the HMD). For example, loading includes sequentially loading the received first five lines of the left eye frame into memory and then into the left eye display device, loading the received first five lines of the right eye frame into memory and then into the right eye display device, loading the received lines 6-10 of the left eye frame into memory and then into the left eye display device, loading the received lines 6-10 of the right eye frame into memory and then into the right eye display device, etc. In some implementations, received frame transmissions are loaded directly into the left eye display device and the right eye display device, respectively. In some implementations, the right eye display device is paused while the left eye display device is loading, and the left eye display device is paused while the right eye display device is loading.

At block 440, the method 400 concurrently displays a loaded left eye frame and a loaded right eye frame at the electronic device. For example, once both frames are fully loaded, they are displayed at the same time at the left eye display device and the right eye display device (e.g., the left and right displays are updated with the new frames at the same time). Pairs or corresponding frames of left eye and right eye images (e.g., video content) are simultaneously displayed by the left eye display device and the right eye display device at a constant frame rate. Interleaving reduces an amount of time between loading data onto the left eye and right eye display devices and actual presentation at the HMD device by the display devices.

Figure 5:
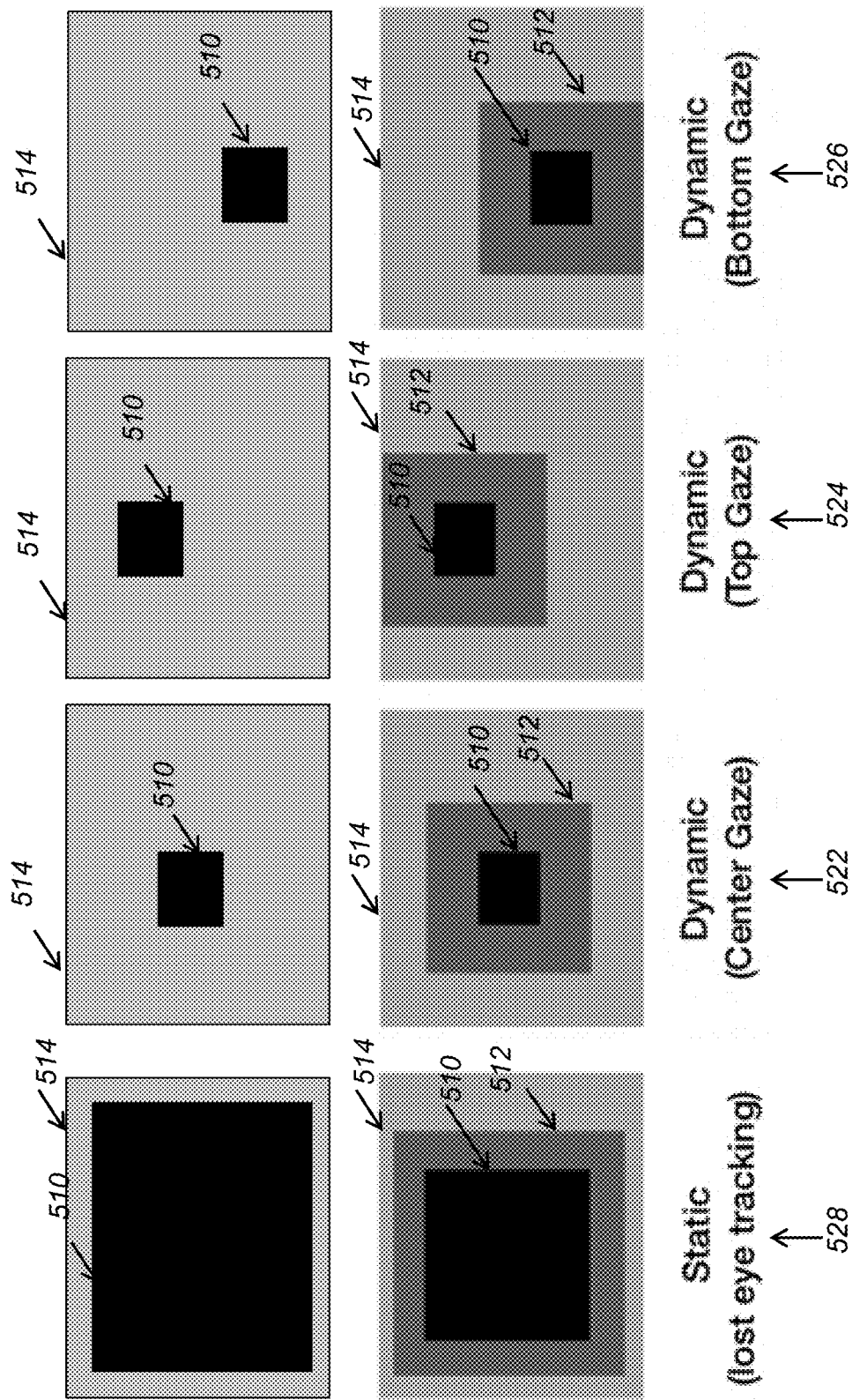
FIG. 5 is a block diagram of example foveated image frames in accordance with some implementations.

In various implementations, the image frames can be transmitted at full display resolution or reduced resolution. Display resolution or display mode of a display device is the number of distinct pixels in each dimension that can be displayed, for example, listed as width by height, with the units in pixels. In various implementations, reducing image resolution includes using foveated imaging where an amount of detail or resolution varies in the image according to one or more "fixation points." A fixation point or gaze indicates the highest resolution region of the image and corresponds to the center of the eye's retina, the fovea. As shown in FIG. 5, gaze tracking can be used to provide one level of foveation with full resolution in area 510 and low or reduced resolution in area 514. Alternatively, two or more levels of foveation can be provided as shown by intermediate resolution area 512 that is between full resolution area 510 and low resolution area 514.

In various implementations, gaze tracking (e.g., gaze tracking unit 346) can cause image frames to be transmitted as center gaze images frames 522, top gaze images frames 524, bottom gaze images frames 526 or static gaze images frames 528. While not shown, it should be appreciated that full resolution area 510 and intermediate resolution area 512 can also be displaced horizontally based on the detected user's gaze. In one implementation, non-foveated frames or static foveated frames 528 are used when gaze tracking has been lost. In various implementations, a size of a fovea region (e.g., 510) in the center gaze images 522, the top gaze images frames 524, and/or the bottom gaze images frames 526 will dynamically change depending on various conditions. For example, the size of the fovea region depends on accuracy of gaze tracking, speed of eyeball movement, amount of eyeball movement, ease of individual user gaze tracking, contact lenses, and the like. For example, 10° of gaze tracking error compared with 1° of gaze tracking error will increase a gaze tracking region size, which causes more high resolution image data and increases total data for transmission. In various implementations, redundant data can be implemented by copying rows of image data to decrease vertical image resolution or copying columns of image data to decrease horizontal image resolution. In various implementations, redundant data can be implemented by copying blocks of image data to decrease vertical image resolution or copying blocks of image data to decrease horizontal image resolution.

Figure 6:
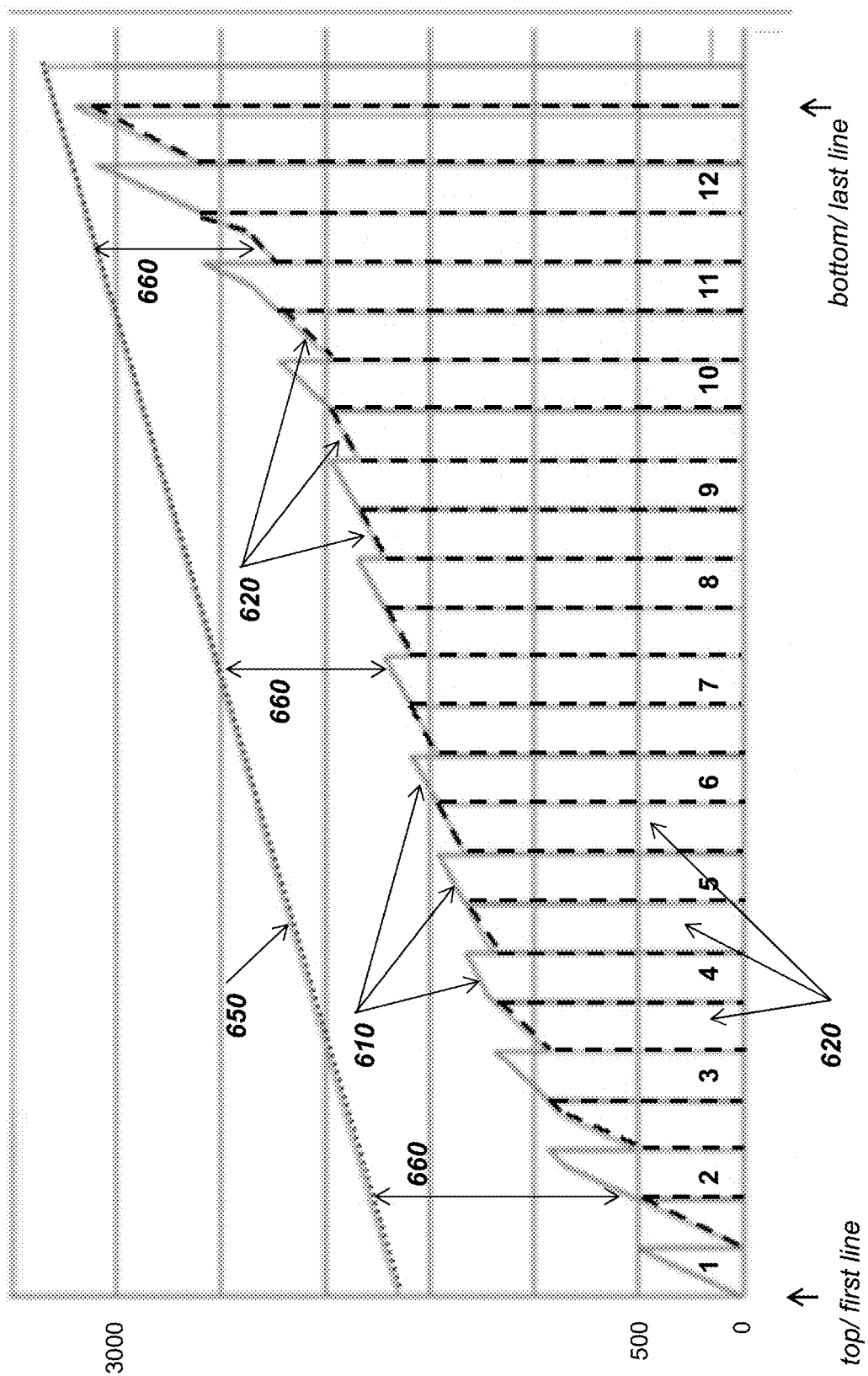
FIG. 6 is a schematic diagram of an example of alternately received image data loading in accordance with some implementations.

FIG. 6 is a schematic diagram of an example of alternately received image data loading. This example involves loading individual portions 610 of an image frame for a first left eye display device (solid lines) and then loading individual portions 620 of an image frame for the second right eye display device (dashed lines) in accordance with some implementations. In some implementations, the second right eye display device is paused while the first left eye display device is loading, and the first left eye display device is paused while the second right eye display device is loading. In FIG. 6, the X axis shows lines/rows of the display device (e.g., pixel rows) being loaded from a top row to a bottom row for each of the display devices. In FIG. 6, the Y axis shows time to load a frame of image data onto both the first left eye display device and the second right eye display device. As shown in FIG. 6, individual ones of the interleaved serial data 610, 620 include less than the full image frame and are alternately loaded into the left eye display device and the right eye display device, respectively. In FIG. 6, each of the portions of the interleaved data 610, 620 is for about 1/12 of the image frame of each display device. However, the interleaved data can be a packet, a single line of the image frame, or a plurality of lines for the image frame (e.g., 32 rows, 64 rows, 100 rows, etc.).

In FIG. 6, the line 650 represents a synchronized rolling shutter presentation of the loaded pixel data from a first line (e.g., a top row) to a last line (e.g., a bottom row) of the left eye and right eye display devices. Once begun, the synchronized rolling shutter presentation cannot be paused or interrupted. Delayed emission 660 illustrates the time from loading image frame data (e.g., individual pixel charge) into the display device until the loaded data is illuminated or presented for viewing by the user with the synchronized rolling shutter presentation.

In various implementations, method and/or systems manage a balance between wireless communications link latency and presented video quality between the controller 110 and the HMD 120. In some implementations, switching between operational schemes is based on channel conditions, and/or eye tracking.

Figure 7:
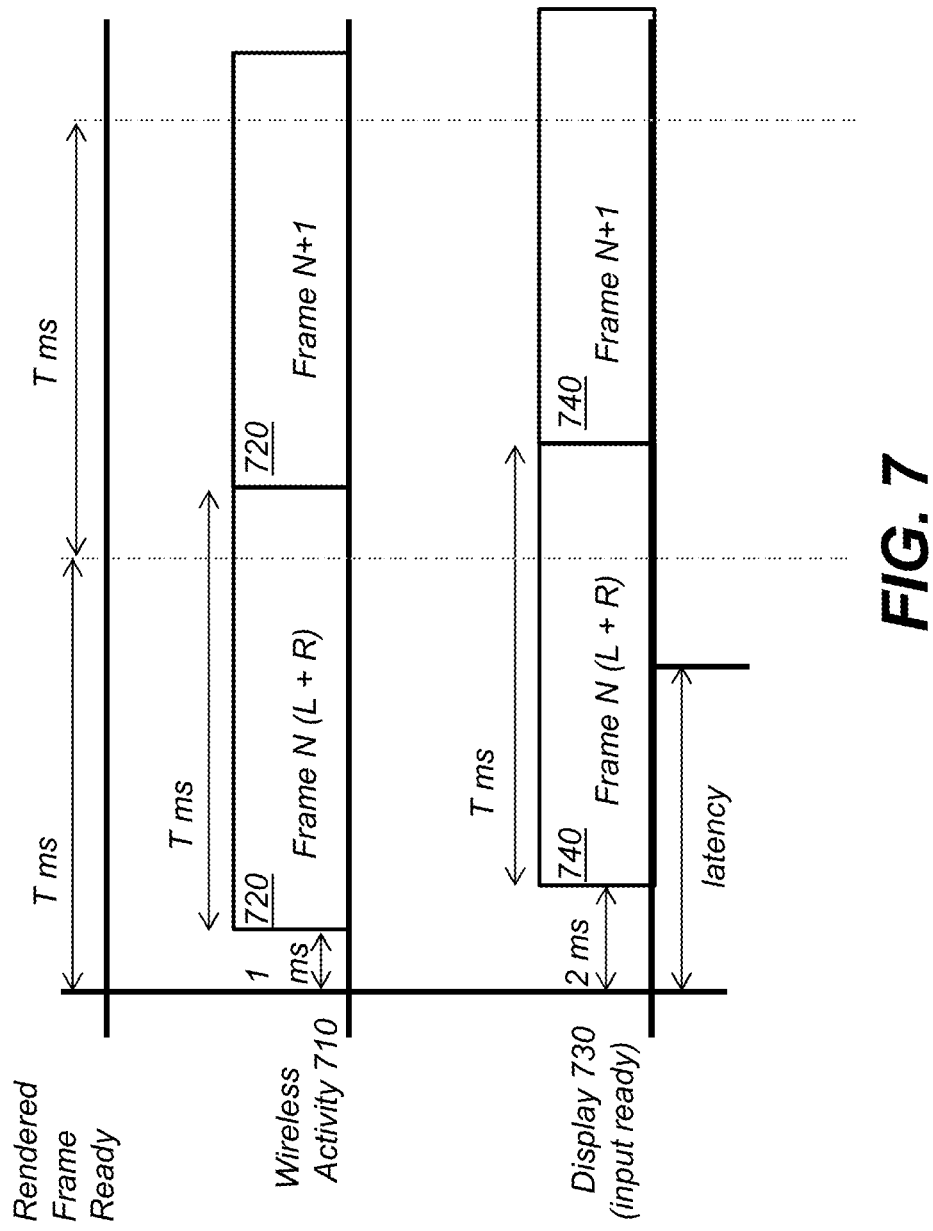
FIG. 7 is a schematic diagram of an example operational scheme to manage wireless communications link latency and presented video quality in accordance with some implementations.

FIG. 7 is a schematic diagram of an example of an operational scheme to interleave or multiplex left eye and right eye image data for simultaneous presentation. As shown in FIG. 7, a first operational scheme shows wireless activity 710 transmits a frame 720 (e.g., frame N and frame N+1) of interleaved left eye image data and right eye image data intermixed over the serial wireless communications link in a period of T milliseconds (ms). For example, the interleaved data is by packet or image slice (e.g., prescribed number of image rows). Display activity 730 shows how frames 740 (e.g., frame N and frame N+1) of left eye image data are loaded into a left eye display device and the frames of right eye image data are loaded into a right eye display device over the time period of T ms. Pairs or corresponding frames of left eye and right eye images are simultaneously displayed by the left eye display device and the right eye display device at a constant frame rate such as 120 fps. In various implementations, the left eye display device and the right eye display device use a rolling shutter presentation technique or a global shutter presentation technique.

In some implementations, the first operational scheme shown in FIG. 7 can be used when the HMD 120 is presenting static foveation image frames or non-foveated image frames. Static foveation image frames have resolution less than full display device resolution, but greater than dynamic foveation resolution. Dynamic foveation requires concurrent gaze tracking so that an area of high resolution on any image frame is reduced. Static foveation requires a larger area of high resolution, e.g., centered at the image frame, until once again, gaze tracking occurs. In some implementations, full resolution images can be 3000 by 2800 pixels, static foveation image resolution can be 2800 by 2500 pixels, and dynamic foveation image resolution can be and/or average 1800 by 1500 pixels. Thus, dynamic foveation transmits significantly less data per image frame.

Figure 8:
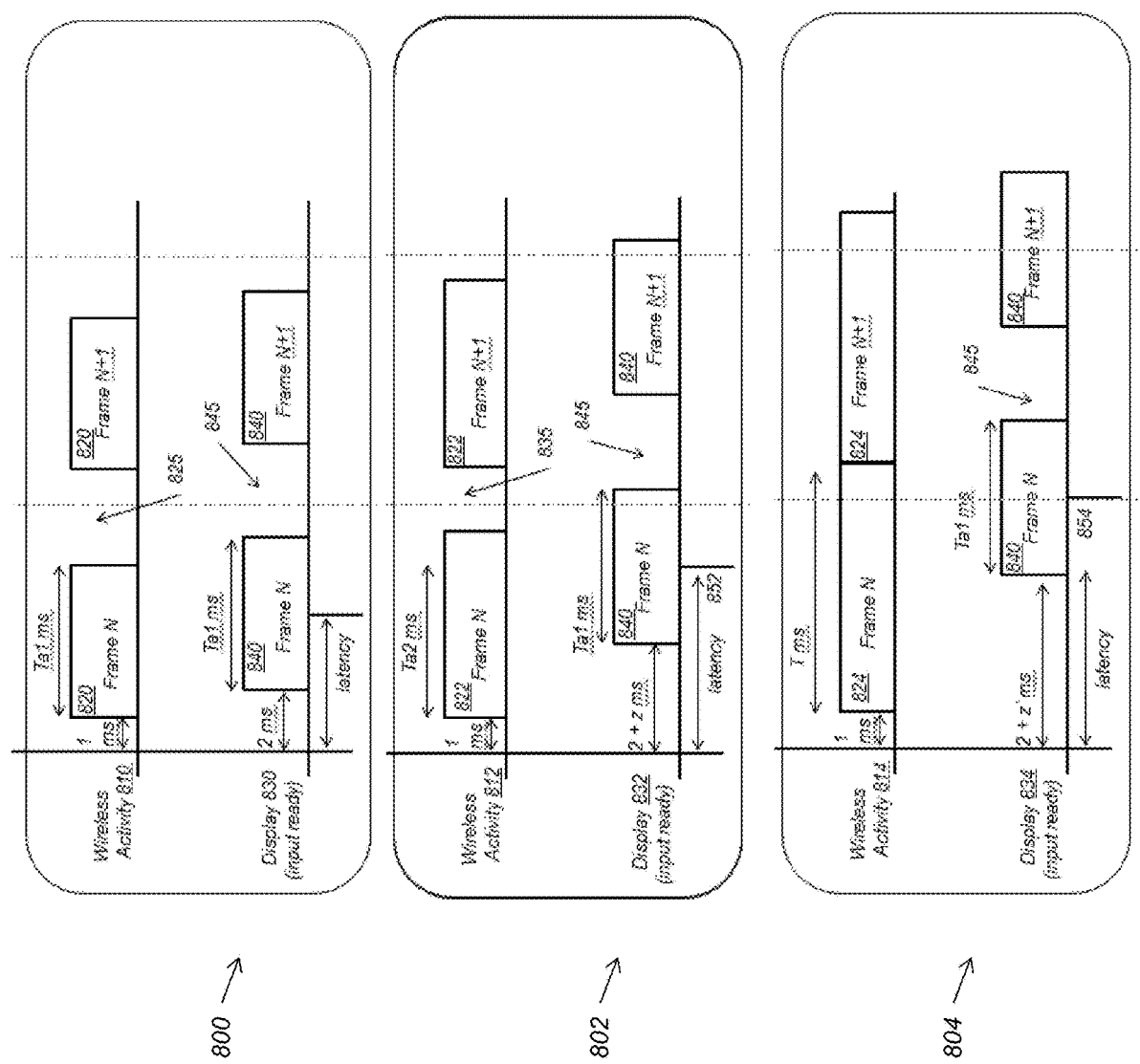
FIG. 8 is a block diagram of additional example operational schemes to manage wireless communications link latency and presented video quality in accordance with some implementations.

FIG. 8 is a schematic diagram of examples of additional operational schemes to interleave left eye and right eye image data transmission for simultaneous presentation. In various implementations, the additional operational schemes as shown in FIG. 8 use dynamic foveation to reduce a frame transmission time and a display data loading time. In operational scheme 800, wireless activity 810 transmits a frame 820 (e.g., frame N and frame N+1) of interleaved foveated left eye image data and foveated right eye image data intermixed over the serial wireless communications link in a period of Ta1 ms. Ta1 ms is less than T ms, e.g., proportional to bandwidth. Wireless activity 810 transmits at the same frame rate over the wireless communications link as wireless activity 710. Display activity 830 shows that frames 840 (e.g., frame N and frame N+1) of foveated left eye image data are loaded into a left eye display device and that frames of foveated right eye image data are loaded into a right eye display device over the time period of Ta1 ms, which is less than the time period T ms. In one implementation, the time period of Ta1 ms is ½ the time period T ms. Pairs or corresponding frames of left eye and right eye images are simultaneously displayed by the left eye display device and the right eye display device at a constant frame rate. Accordingly, operational scheme 800 provides a gap 825 in the wireless activity 810 and a gap 845 in the display activity 830. To reduce power consumption by the controller 110 and the HMD 120, wireless communications can be turned off during the gap 825, for example without a reduction in presented video quality.

In various implementations, LOS and non-LOS wireless communications between the controller 110 and the HMD 120 can be error prone. For example, as a wireless communications transmission distance increases, wireless communications errors increase. Depending on an actual environment, wireless communications data loss can be higher than desired. For example, operational scheme 800 can still be susceptible to wireless communications errors. In some implementations, allowing some latency time (e.g., latency budget) for the operational scheme for wireless transmission would allow multiple data re-transmissions that will lower wireless communications errors (e.g., re-transmit lost, noisy or incomplete data) and produce higher quality presented video. In one implementation, even 200 microseconds (μs) of latency budget can improve presented video quality. Such a latency budget can allow for re-transmission of critical and/or selected video data or packets.

Operational scheme 802 uses the same low resolution allowed by dynamic foveation, but uses a lower data transmission rate and takes longer than operational scheme 800 to transmit a frame 822 (e.g., frame N and frame N+1) of interleaved foveated left eye image data and foveated right eye image data. The lower data transmission rate of operational scheme 802 reduces channel error (e.g., probabilistic error) and/or reduces peak data rate.

In operational scheme 802, wireless activity 812 transmits a frame 822 (e.g., frame N and frame N+1) of interleaved foveated left eye image data and foveated right eye image data intermixed over the serial wireless communications link in a period of Ta2 ms, which is greater than Ta1 ms and less than T ms. Display activity 832 shows frames 840 (e.g., frame N and frame N+1) of foveated left eye image data is loaded into a left eye display device and the frame of foveated right eye image data is loaded into a right eye display device over the time period of Ta1 ms. Pairs or corresponding frames of left eye and right eye images are simultaneously displayed by the left eye display device and the right eye display device at a constant frame rate. Accordingly, a smaller gap 835 occurs in the wireless activity 812, and the gap 845 remains in the display activity 832. To reduce power consumption by the controller 110 and the HMD 120, wireless communications can be turned off during the gap 835, for example without a reduction in presented video quality.

In operational scheme 802, a time from data transmission receipt to presented video (e.g., consumption) 852 provides additional time in the latency budget, which can allow for an increase in redundant data transmission (although at a lower transmission rate) relative to operational scheme 802. The additional latency budget operational scheme 802 requires additional memory on the HMD 120 to store the received image data before data loading into the left eye and the right eye display devices is started.

Operational scheme 804 extends operational scheme 802 by reducing a wireless communications transmission rate until a gap (e.g., gap 825, gap 835) in wireless activity 814 is eliminated. Operational scheme 804 uses the same low resolution allowed by dynamic foveation, but uses a lower data transmission rate and takes longer than operational scheme 802 to transmit a frame 842 (e.g., frame N and frame N+1) of interleaved foveated left eye image data and foveated right eye image data. The lower data transmission rate of operational scheme 804 further reduces channel error (e.g., probabilistic error) and/or reduce peak data rate. In operational scheme 804, a time from data transmission receipt to presented video (e.g., consumption) 854 provides additional time in the latency budget, which can allow for an increase in redundant data transmission (although at a lower transmission rate) relative to operational scheme 802. Again, the additional latency budget in operational scheme 804 requires more memory on the HMD 120 than operational scheme 802.

In some implementations, systems and/or methods switch between operational schemes 800, 802 and 804 in accordance with the wireless communications link conditions (e.g., available bandwidth, transmission errors) traded off against desirable reduced power consumption. Various method and/or system implementations are not intended to be limited to the operational schemes of FIGS. 7-8. For example, various implementations can dynamically exchange wireless communication link bandwidth with gap size (e.g., 825, 835) and power consumption. Similarly, or in combination, latency and wireless communication link quality can be dynamically exchanged to improve overall video content quality (e.g., latency budget) for wireless communications between the controller 110 and the HMD 120.

As shown in FIG. 8, foveated image frames used in presented video at the HMD 120 allow reduced amounts of image data to be transmitted. Further, as described herein, an amount of image data in foveated image frames may be dynamic and changes with eye tracking conditions. Although not to be limited thereby, example foveated data transmission for center gaze images frames 522, top gaze images frames 524, bottom gaze images frames 526 are shown in FIG. 9A-9C.

Figure 9B:
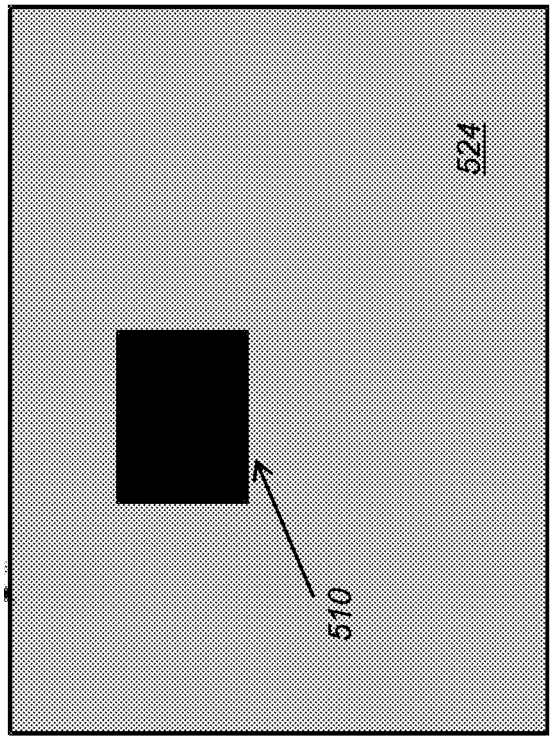
FIGS. 9A-9C are schematic diagrams that show examples of interleaved foveated image frame data for a single eye display device in accordance with some implementations.
Figure 9B:
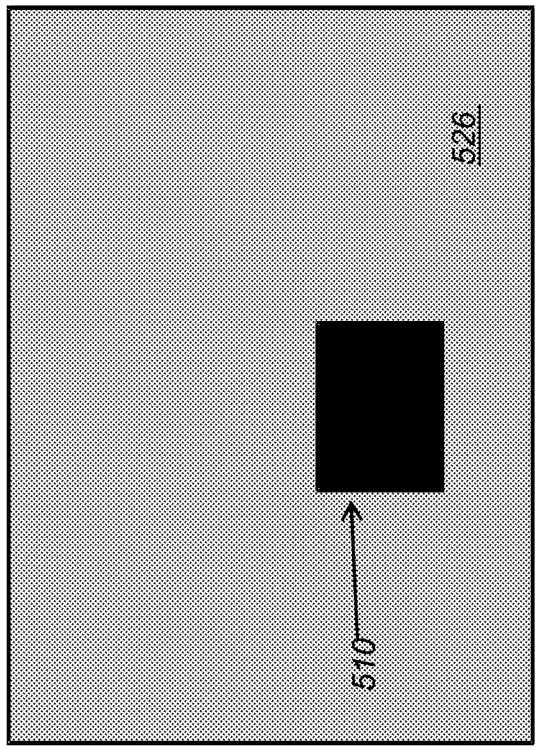
Figure 9B:
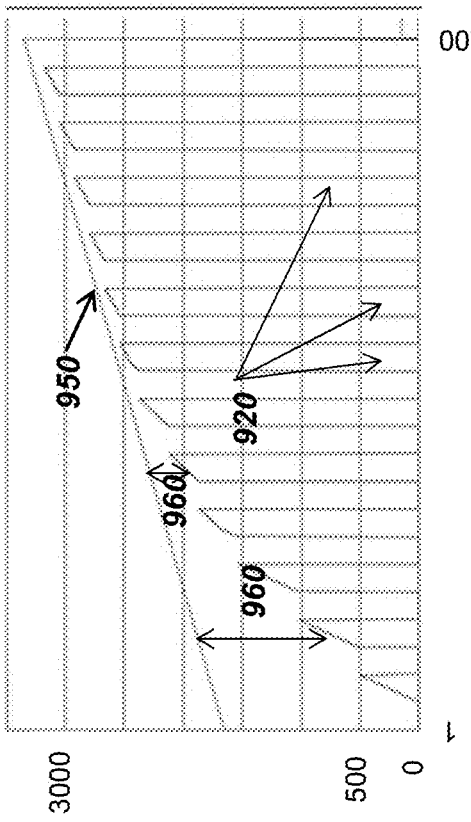
Figure 9A:
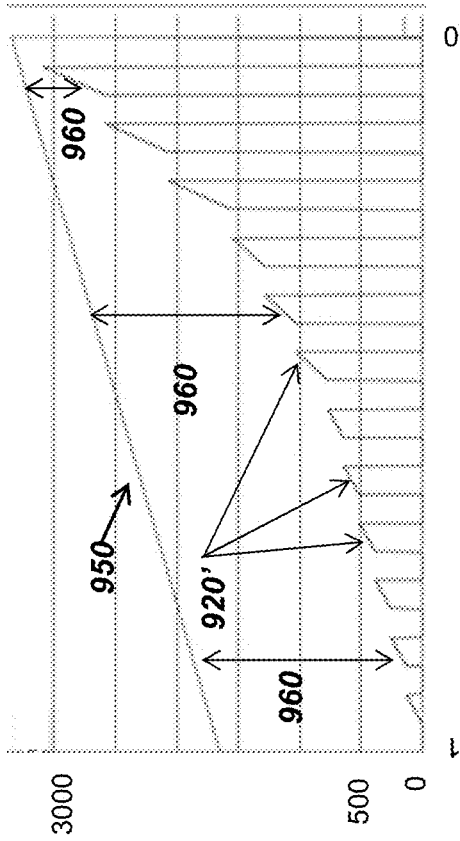
Figure 9C:
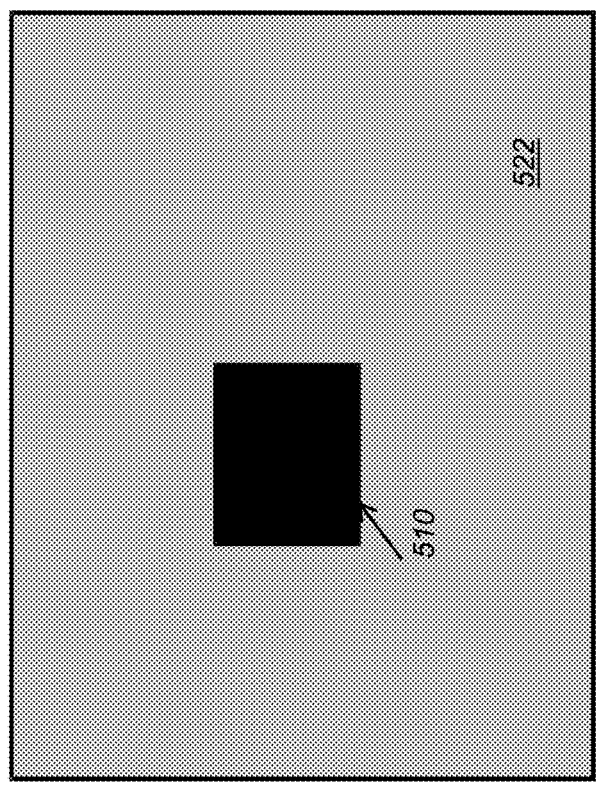

FIGS. 9A-9C show examples of interleaved foveated image frame data for a single eye display device (e.g., a left eye display device or a right eye display device). In FIG. 9A, individual ones of the interleaved serial data 920 include less than the full image frame and are alternately loaded into a single eye display device (e.g., the right eye display device) while the remaining eye display device is paused. In one implementation, all individual ones of the interleaved serial data 920 together form one (1) frame of presented video for one of the two eye display devices at the HMD. The interleaved serial data 920 transmits full resolution data (e.g., unique pixel data for each row) in a top portion of the display device and reduced resolution data (e.g., identical pixel information loaded into a plurality of rows such as 2-16 rows) in a bottom portion of the display device. Similarly, as shown in FIG. 9B, the interleaved serial data 920' transmits full resolution data (e.g., unique pixel data for each row) in a bottom portion of the display device and reduced resolution data (e.g., identical pixel information loaded into a plurality of rows such as 2-16 rows) in a top portion of the display device. As shown in FIG. 9C, the interleaved serial data 920" transmits full resolution data (e.g., unique pixel data for each row) in a middle portion of the display device and reduced resolution data (e.g., identical pixel information loaded into a plurality of rows such as 2-16 rows) in a top portion and a bottom portion of the display device. Also, data resolution can vary along the row of data with unique pixel data provided for the foveated region of the row and identical pixel information loaded into more than 1 column outside the foveated region. Thus, transmission time over the wireless communication link and/or data loading time at the display device is faster for foveated portions of the image frame.

Figure 10A:
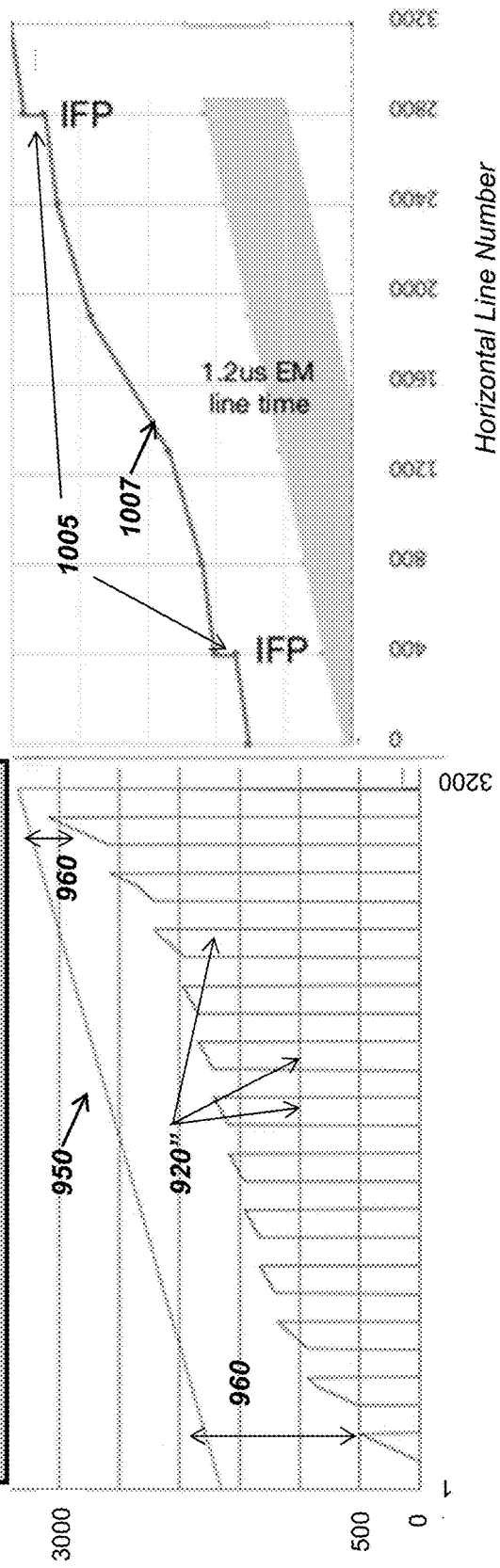
FIGS. 10A-10B are schematic diagrams that show examples of interleaved foveated image frame data loading for both left and right eye display devices in accordance with some implementations.
Figure 10B:
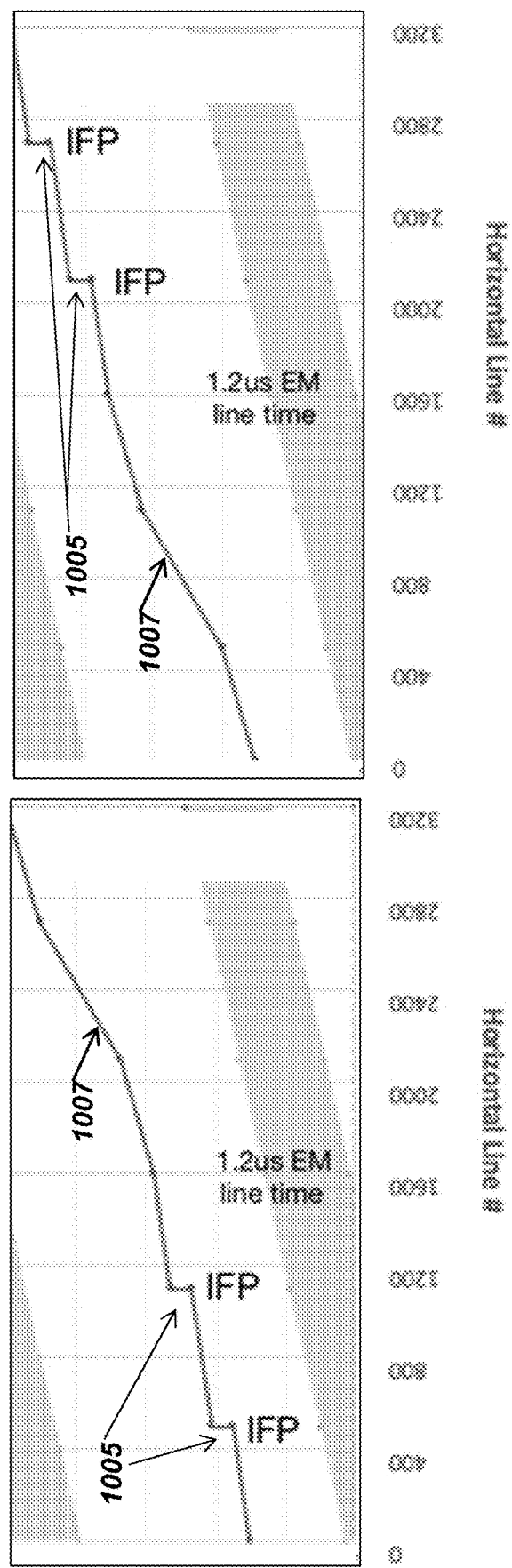

As shown in FIGS. 9A-9C, foveated data in the image frame still has a delayed emission 960 time from loading image frame data (e.g., individual pixel charges) into the left eye and the right eye display devices until the loaded data is illuminated or presented for viewing by the display devices. In various method and/or system implementations, intra-frame pause (IFP) can be implemented to reduce delayed emission 660/960 time. As shown in FIG. 10A-10C, one or more IFPs 1005 can be implemented according to a location of foveation (e.g., top gaze, bottom gaze) in the video content. During the IFP 1005, data loading of interleaved image frame transmission for the left eye display device and the right eye display device are both stopped for a period of time. Use of IFPs 1005 increase a data loading time for each eye display device at the HMD 120, but can reduce delayed emission time and/or generate a more linear data loading curve 1007 of the eye display device.

Figure 11:
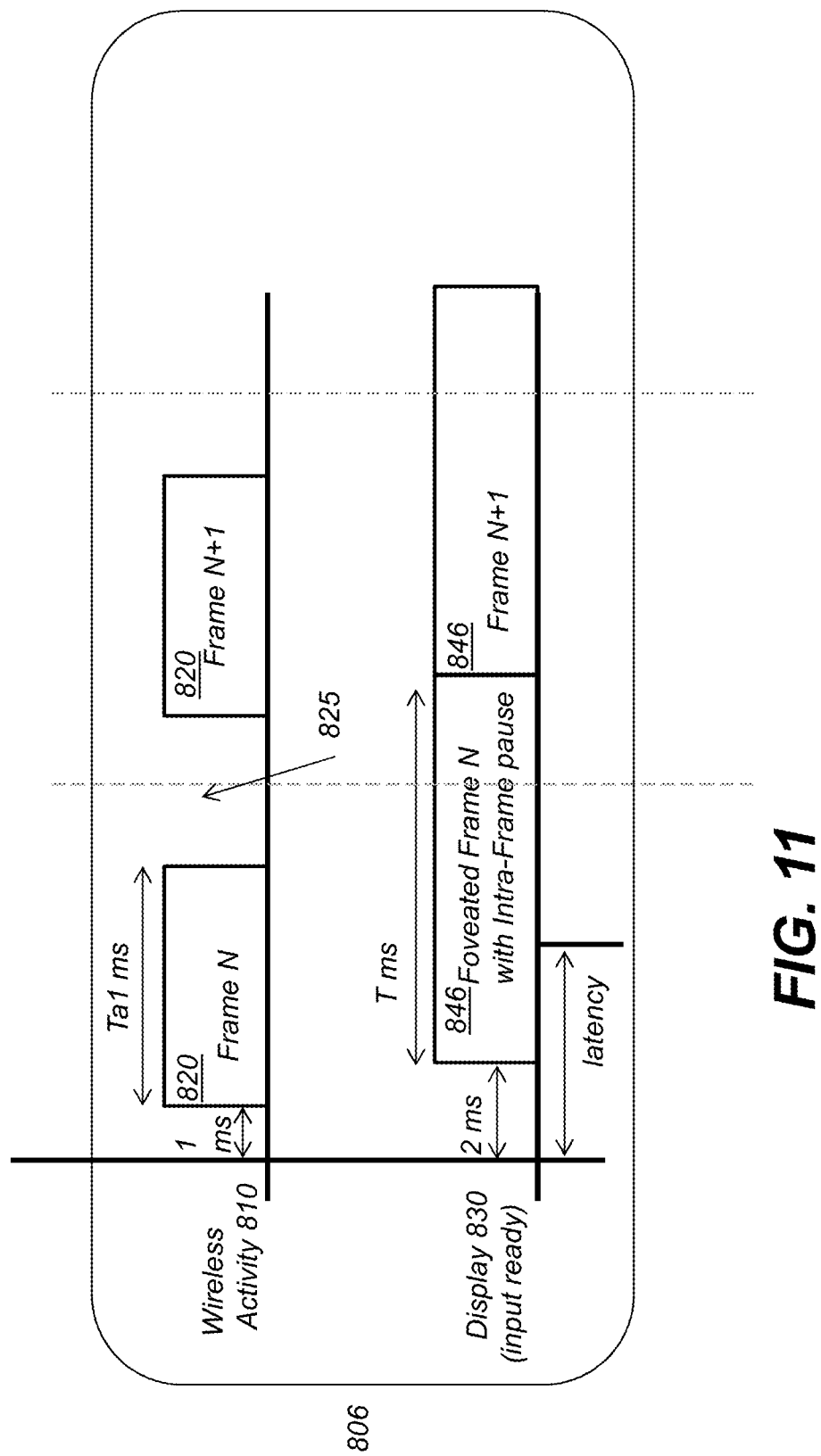
FIG. 11 is a schematic diagram of another example additional operational scheme to manage wireless communications link latency and presented video quality in accordance with some implementations.

FIG. 11 is a schematic diagram of another example additional operational scheme to interleave dynamically foveated left eye and right eye image data transmission for simultaneous presentation. In operational scheme 806, wireless activity 810 transmits a frame 820 (e.g., frame N and frame N+1) of interleaved foveated left eye image data and foveated right eye image data intermixed over the serial wireless communications link in a period of Ta1 ms. Display activity 836 shows frames 846 (e.g., frame N and frame N+1) of foveated left eye image data is loaded into a left eye display device and the frame of foveated right eye image data is loaded into a right eye display device over the time period of T ms using at least one IFP 1005. Pairs or corresponding frames of left eye and right eye images are simultaneously displayed by the left eye display device and the right eye display device at a constant frame rate. Accordingly, a gap 825 exists in the wireless activity 810, but the display activity 836 is continuous.

Figure 12:
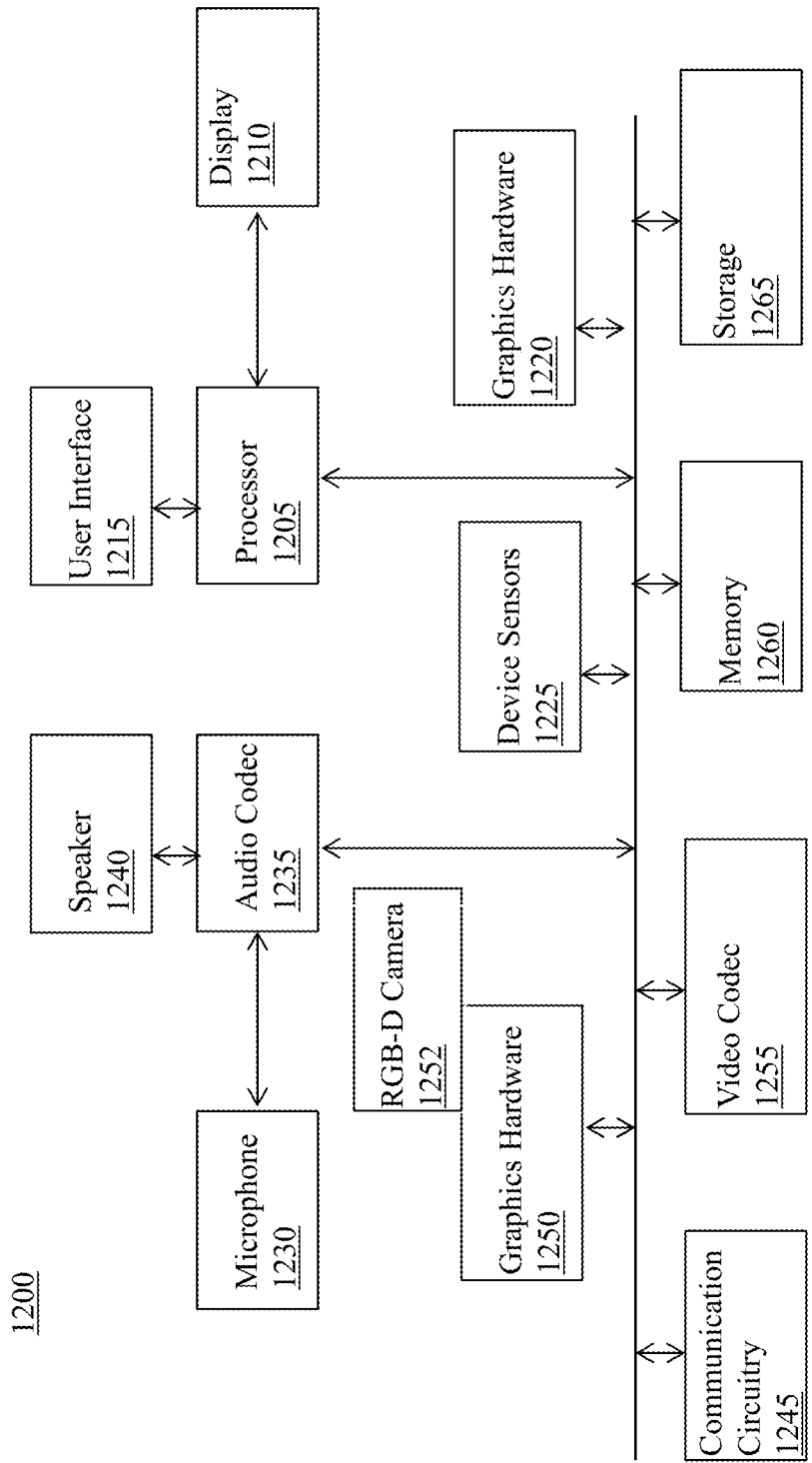
FIG. 12 is a simplified functional block diagram that shows an example multifunction device in accordance with some implementations.

Referring now to FIG. 12, a simplified functional block diagram of a multifunction device 1200 is shown in accordance with some implementations. In some implementations, multifunction electronic device 1200 includes processor 1205, display 1210, user interface 1215, graphics hardware 1220, device sensors 1225 (e.g., proximity sensor/ambient light sensor, accelerometer and/or gyroscope), microphone 1230, audio codec(s) 1235, speaker(s) 1240, communications circuitry 1245, digital image capture circuitry 1250 (e.g., including sensors such as RGB-D camera 1252), video codec(s) 1255 (e.g., in support of digital image capture unit 1250), memory 1260, storage device 1265, and communications bus 1270. In some implementations, the multifunction electronic device 1200 is a digital camera, portable electronic device or a personal electronic device, such as a personal digital assistant (PDA), personal music player, mobile telephone, or a tablet computer.

In some implementations, the processor 1205 executes instructions necessary to carry out or control the operation of many functions performed by the device 1200 (e.g., the generation and/or processing of images as disclosed herein). The processor 1205, for instance, drives the display 1210 and receives user input from the user interface 1215. The user interface 1215, in some implementations, allows a user to interact with the device 1200. For example, the user interface 1215 can take a variety of forms, such as a button, keypad, dial, a click wheel, keyboard, display screen and/or a touch screen. The processor 1205 can also, for example, be a system-on-chip such as those found in mobile devices and include a dedicated graphics processing unit (GPU). In some implementations, the processor 1205 is based on reduced instruction-set computer (RISC) or complex instruction-set computer (CISC) architectures or any other suitable architecture and may include one or more processing cores. The graphics hardware 1220 in some implementations is a special purpose computational hardware for processing graphics and/or assisting the processor 1205 to process graphics information. In some implementations, the graphics hardware 1220 includes a programmable GPU.

In some implementations, the image capture circuitry 1250 uses sensors (or pixel sensors, or sensor elements, or pixel elements) to capture images and/or CGR experiences. Output from the image capture circuitry 1250 is processed, at least in part, by the video codec(s) 1255 and/or the processor 1205 and/or the graphics hardware 1220, and/or a dedicated image processing unit or pipeline incorporated within the circuitry 1250. Images so captured can be stored in the memory 1260 and/or storage 1255. In some implementations, the images captured by sensors and the image capture circuitry 1250 are processed in accordance with the methods disclosed herein, at least in part, by video codec(s) 1255 and/or processor 1205 and/or graphics hardware 1220, and/or a dedicated image processing unit incorporated within the circuitry 1250. Images so captured and/or processed are stored in memory 1260 and/or storage 1265. The memory 1260 includes one or more different types of media used by the processor 1205 and graphics hardware 1220 to perform device functions. For example, the memory 1260 can include memory cache, read-only memory (ROM), and/or random access memory (RAM). The storage 1265 can store media (e.g., audio, image and video files), computer program instructions or software, preference information, device profile information, and any other suitable data. In some implementations, the storage 1265 includes one more non-transitory storage mediums including, for example. magnetic disks (fixed, floppy, and removable) and tape, optical media such as CD-ROMs and digital video disks (DVDs). and semiconductor memory devices such as Electrically Programmable Read-Only Memory (EPROM), and Electrically Erasable Programmable Read-Only Memory (EEPROM). In some implementations, the memory 1260 and storage 1265 are used to tangibly retain computer program instructions or code organized into one or more modules and written in any desired computer programming language. When executed by, for example, the processor 1205, such computer program code can implement one or more of the methods described herein.

In some implementations, the gaze tracking is performed on two eyes of a same individual concurrently. In some implementations, one or more event cameras capture one or more images of portion of the face that includes both eyes. In implementations in which images of both eyes are captured or derived, the controller 110 could determine or produce output useful in determining a convergence point of gaze directions from the two eyes. The controller 110 could additionally or alternatively be trained to account for extraordinary circumstances such as optical axes that do not align.

In some implementations, post-processing of gaze characteristic is employed. Noise in the tracked points can be reduced using filtering and prediction methods, for example, using a Kalman filter. These methods can also be used for interpolation/extrapolation of the gaze characteristic over time. For example, the methods can be used if the state of the gaze characteristic is required at a timestamp different from the recorded states.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method, comprising:
   establishing at least one wireless communication link between an electronic device and a host electronic device;
   receiving, from the host electronic device via a single wireless communication link of the at least one wireless communication link, a left eye frame of image data and a right eye frame of image data via a sequence of interleaved left eye image frame transmissions and right eye image frame transmissions;
   loading the left eye frame of image data into a left eye display device and the right eye frame of image data into a right eye display device on the electronic device, wherein the loading comprises sequentially and alternately loading one of left eye image frame portions of the left eye frame of image data and one of right eye image frame portions of the right eye frame of image data as the sequence of interleaved left eye image frame transmissions and right eye image frame transmissions is received; and concurrently displaying the left eye frame of image data and the right eye frame of image data at the electronic device.

2. The method of claim 1, wherein the left eye image frame transmissions and the right eye image frame transmissions are transmitted alternately.

3. The method of claim 1, wherein the left eye image frame portions and the right eye image frame portions are each less than a frame of image data.

4. The method of claim 1, wherein the left eye image frame portions and the right eye image frame portions are each a subset of lines of a frame of data.

5. The method of claim 1, wherein the left eye image frame portions and the right eye image frame portions are packets of the single wireless communication link that alternate left eye display device data and right eye display device data.

6. The method of claim 1, wherein the sequentially loading left eye image frame portions and right eye image frame portions as the sequence of interleaved left eye image frame transmissions and right eye image frame transmissions is received comprises:

loading a left eye image frame portion in the left eye display device while pausing the loading of image data for the right eye display device; and loading a right eye image frame portion in the right eye display device while pausing the loading of image data for the left eye display device.

7. The method of claim 6, wherein the left eye image frame portions and the right eye image frame portions are a packet, a line or a slice of a frame of data for the left eye display device and the right eye display device.

8. The method of claim 1, wherein the left eye image frame portions and the right eye image frame portions comprise augmented reality (AR) or virtual reality (VR) video or images.

9. The method of claim 1, wherein the displayed left eye frame of image data and the displayed right eye frame of image data are foveated frames, wherein a foveated portion of each of foveated frames is in an upper portion, a middle portion or a lower portion.

10. The method of claim 9, comprising:

pausing the loading of image data for both the left eye display device and the right eye display device during transmission of a foveated portion of the frames of image data.

11. The method of claim 1, wherein the displayed left eye frame of image data and the displayed right eye frame of image data comprise foveated frames, the method further comprises:

determining a gaze position when viewing a stereoscopic scene; and pausing the loading of image data for the left eye display device and the right eye display device during receipt of a lower foveated portion of the image frame when the determined gaze position corresponds to a top portion of the image frames.

12. The method of claim 1, wherein the electronic device is a head mounted display (HMD).

13. The method of claim 1, wherein the left eye frame of image data and the right eye frame of image data are concurrently displayed at least at 120 frames per second using a rolling shutter presentation technique.

14. The method of claim 1, comprising buffering a plurality of the interleaved left eye image frame portions and right eye image frame portions by storing buffered frame data in memory before said loading the left eye frame into the left eye display device and the right eye frame into the right eye display device.

15. The method of claim 14, wherein the buffered frame data comprises less than a frame of image data.

16. A system comprising:

a non-transitory computer-readable storage medium; and one or more processors coupled to the non-transitory computer-readable storage medium, wherein the non-transitory computer-readable storage medium comprises program instructions that, when executed on the one or more processors, cause the system to perform operations comprising:

establishing at least one wireless communication link between an electronic device and a host electronic device;

receiving, from the host electronic device via a single wireless communication link of the at least one wireless communication link, a left eye frame of image data and a right eye frame of image data via a sequence of interleaved left eye image frame transmissions and right eye image frame transmissions;

loading the left eye frame of image data into a left eye display device and the right eye frame of image data into a right eye display device on the electronic device, wherein the loading comprises sequentially and alternately loading one of left eye image frame portions of the left eye frame of image data and one of right eye image frame portions of the right eye frame of image data as the sequence of interleaved left eye image frame transmissions and right eye image frame transmissions is received; and concurrently displaying the left eye frame of image data and the right eye frame of image data at the electronic device.

17. The system of claim 16, wherein the sequentially loading left eye image frame portions and right eye image frame portions as the sequence of interleaved left eye image frame transmissions and right eye image frame transmissions is received comprises:

loading a left eye image frame portion in the left eye display device while pausing the loading of image data for the right eye display device; and loading a right eye image frame portion in the right eye display device while pausing the loading of image data for the left eye display device.

18. The system of claim 16, wherein the displayed left eye frame of image data and the displayed right eye frame of image data comprise foveated frames, the operations further comprising:

determining a gaze position when viewing a stereoscopic scene; and pausing the loading of image data for the left eye display device and the right eye display device during receipt of a lower foveated portion of the image frame when the determined gaze position corresponds to a top portion of the image frame.

19. A non-transitory computer-readable storage medium, storing program instructions computer-executable on a computer to perform operations comprising:
- establishing at least one wireless communication link between an electronic device and a host electronic device;
- receiving, from the host electronic device via a single wireless communication link of the at least one wireless communication link, a left eye frame of image data and a right eye frame of image data via a sequence of interleaved left eye image frame transmissions and right eye image frame transmissions;
- loading the left eye frame of image data into a left eye display device and the right eye frame of image data into a right eye display device on the electronic device, wherein the loading comprises sequentially and alternately loading one of left eye image frame portions of the left eye frame of image data and one of right eye image frame portions of the right eye frame of image data as the sequence of interleaved left eye image frame transmissions and right eye image frame transmissions is received; and
- concurrently displaying the left eye frame of image data and the right eye frame of image data at the electronic device.

20. The non-transitory computer-readable storage medium of claim 19, wherein the sequentially loading left eye image frame portions and right eye image frame portions as the sequence of interleaved left eye image frame transmissions and right eye image frame transmissions is received comprises:
- loading a left eye image frame portion in the left eye display device while pausing the loading of image data for the right eye display device; and
- loading a right eye image frame portion in the right eye display device and while pausing the loading of image data for the left eye display device, wherein the left eye image frame transmissions and the right eye image frame transmissions include a packet, a line or a slice of a frame of data for the left eye display device the right eye display device, respectively.

* * * * *